US012227682B2

United States Patent
Van De Hey et al.

(10) Patent No.: US 12,227,682 B2
(45) Date of Patent: Feb. 18, 2025

(54) PAPER WRAPPING MATERIALS AND METHOD FOR A HIGHLY COMPRESSED PRODUCT

(71) Applicant: C3 Corporation, Appleton, WI (US)

(72) Inventors: Joseph F. Van De Hey, Kaukauna, WI (US); Jeffery J. VanHandel, Freedom, WI (US); Alex M. Zirbel, Kaukauna, WI (US); Alex N. Kuffel, Appleton, WI (US)

(73) Assignee: C3 Corporation, Appleton, WI (US)

( * ) Notice: Subject to any disclaimer, the term of this patent is extended or adjusted under 35 U.S.C. 154(b) by 144 days.

(21) Appl. No.: 18/028,604

(22) PCT Filed: Apr. 23, 2021

(86) PCT No.: PCT/US2021/028865
§ 371 (c)(1),
(2) Date: Mar. 27, 2023

(87) PCT Pub. No.: WO2022/066219
PCT Pub. Date: Mar. 31, 2022

(65) Prior Publication Data
US 2023/0303889 A1 Sep. 28, 2023

Related U.S. Application Data

(60) Provisional application No. 63/084,548, filed on Sep. 28, 2020.

(51) Int. Cl.
*B65D 85/64* (2006.01)
*B31F 5/06* (2006.01)
(Continued)

(52) U.S. Cl.
CPC .................. *C09J 7/21* (2018.01); *B31F 5/06* (2013.01); *B65B 11/04* (2013.01); *B65B 63/024* (2013.01);
(Continued)

(58) Field of Classification Search
CPC ........ B65D 85/07; B65D 85/64; B65B 25/00; B65B 63/024; C09J 7/21; C09J 7/35;
(Continued)

(56) References Cited

U.S. PATENT DOCUMENTS

| | | | |
|---|---|---|---|
| 2,114,008 | A | 4/1938 | Wunderlich |
| 2,157,765 | A | 5/1939 | Lanter |

(Continued)

FOREIGN PATENT DOCUMENTS

| | | |
|---|---|---|
| CN | 112647355 A | 4/2021 |
| DE | 1239979 B | 5/1967 |
| EP | 2835314 B1 | 7/2019 |

OTHER PUBLICATIONS

PCT Search Report and Written Opinion for PCT application PCT/US21/28865 entitled "Paper Wrapping Materials and Method for a Highly Compressed Product", dated Jul. 21, 2021, 7 pages filed herewith.
(Continued)

*Primary Examiner* — Luan K Bui
(74) *Attorney, Agent, or Firm* — Amundsen Davis, LLC (57) ABSTRACT

Paper wrapping materials and method to securely wrap a rolled-up High Expansion Force product. The materials include a kraft paper layer encircling a circumference of the product with a leading end of the paper layer adhered to a tail end of the product by a first hotmelt adhesive. A tail end of the paper layer is adhered to a middle portion of the paper layer with a second hotmelt adhesive encircling the product. The paper layer has: (i) a Basis Weight from about 68
(Continued)

pounds per 3000 feet squared to about 84 pounds per 3000 feet squared, (ii) a Tensile Strength (MD) from about 55 pounds per inch to about 70 pounds per inch, (iii) a Stretch (MD) from about 7% to about 11%, and (iv) a fiber content of at least 70% virgin fibers. The second hotmelt adhesive is between about 15% and about 25% thermoplastic elastomer.

31 Claims, 6 Drawing Sheets

(51) Int. Cl.
| | |
|---|---|
| *B65B 11/04* | (2006.01) |
| *B65B 63/02* | (2006.01) |
| *B65D 65/14* | (2006.01) |
| *B65D 85/07* | (2017.01) |
| *C09J 5/06* | (2006.01) |
| *C09J 7/21* | (2018.01) |
| *C09J 7/35* | (2018.01) |
| *D21H 11/04* | (2006.01) |
| *D21H 27/10* | (2006.01) |

(52) U.S. Cl.
CPC .............. *B65D 65/14* (2013.01); *B65D 85/64* (2013.01); *C09J 5/06* (2013.01); *C09J 7/35* (2018.01); *D21H 11/04* (2013.01); *D21H 27/10* (2013.01); *B65D 2585/647* (2013.01); *C09J 2301/204* (2020.08); *C09J 2301/304* (2020.08); *C09J 2400/283* (2013.01)

(58) Field of Classification Search
CPC ............ C09J 2301/204; C09J 2301/304; C09J 2400/283; C09J 2453/00; C09J 153/02; D21H 11/04; D21H 21/10
USPC ........... 206/398, 400, 410, 411; 53/430, 439
See application file for complete search history.

(56) References Cited

U.S. PATENT DOCUMENTS

| | | | | |
|---|---|---|---|---|
| 2,893,189 | A | | 7/1959 | Lancaster |
| 3,052,073 | A | | 9/1962 | Johansen et al. |
| 3,393,105 | A | | 7/1968 | Tellier, Jr. |
| 3,504,789 | A | * | 4/1970 | Bozewicz ................ C09J 7/22 206/412 |
| 3,521,424 | A | * | 7/1970 | Wirfel .................... B65D 85/07 53/436 |
| 4,003,469 | A | * | 1/1977 | Findlay ................ B65D 85/672 206/83.5 |
| 4,570,789 | A | * | 2/1986 | Fritz ...................... D04B 21/12 206/83.5 |
| 4,608,807 | A | | 9/1986 | Skripalle |
| 5,425,512 | A | | 6/1995 | Bichot et al. |
| 6,892,448 | B2 | | 5/2005 | Gecic |
| 7,017,854 | B2 | | 3/2006 | Gecic et al. |
| 7,100,862 | B2 | | 7/2006 | Skarzenski et al. |
| 7,213,278 | B2 | * | 5/2007 | Peterson ................ A47G 9/086 5/413 R |
| 8,443,974 | B2 | * | 5/2013 | Oh ........................ B65B 25/146 206/394 |
| 2004/0206838 | A1 | | 10/2004 | Gecic et al. |
| 2006/0231436 | A1 | * | 10/2006 | Spinks ................. B65B 63/024 53/430 |
| 2007/0066169 | A1 | | 3/2007 | Perelman et al. |
| 2007/0272574 | A1 | | 11/2007 | Uitenbroek |
| 2008/0118689 | A1 | | 5/2008 | Mehta et al. |
| 2018/0057200 | A1 | * | 3/2018 | Lawrie ................... B65B 5/045 |
| 2018/0148616 | A1 | | 5/2018 | Okazaki et al. |

OTHER PUBLICATIONS

MPT Group Ltd, "Helix RP-2 Innerspring Roll Packing Machine" YouTube video, available from the internet at https://www.youtube.com/watch?v=29nVY_mUZ50 at least as of Sep. 15, 2023, 49 pages filed herewith.
Extended European Search Report dated Jul. 19, 2024 for EP21873108.1, 7 pages filed herewith.

* cited by examiner

PAPER WRAPPING MATERIALS AND METHOD FOR A HIGHLY COMPRESSED PRODUCT

CROSS-REFERENCE TO RELATED APPLICATIONS

This application is a U.S. National Stage Application under 35 USC 371 from PCT Application No. PCT/US21/28865, filed Apr. 23, 2021, and titled: PAPER WRAPPING MATERIALS AND METHOD FOR A HIGHLY COMPRESSED PRODUCT, and claims the benefit of U.S. Provisional Application No. 63/084,548, filed Sep. 28, 2020, and titled: PAPER PACKAGING SYSTEM FOR COMPRESSED HIGH EXPANSION FORCE ROLLED MATERIAL.

TECHNICAL FIELD

This invention relates to rolling up of product in a commercial setting to aid in packaging the same. More specifically, it concerns paper wrapping materials and method used to roll up and finish wrapping compressed high expansion force product into compressed rolls. Such rolls are easier and less expensive to handle, store and ship.

BACKGROUND

In many industries, large quantities of compressible materials must be stored and transported around. Compressing these materials into smaller volumes often results in significant cost savings, but can also cause product defect or pre-mature product degradation. Compressible foam materials such as polyurethane foam layers or other foam types as various combinations of layers like a mattress, including pockets of coils and springs for use in mattress construction, are just a few examples of materials which are more efficiently handled in a compressed form for storage and shipping.

Figure 1:
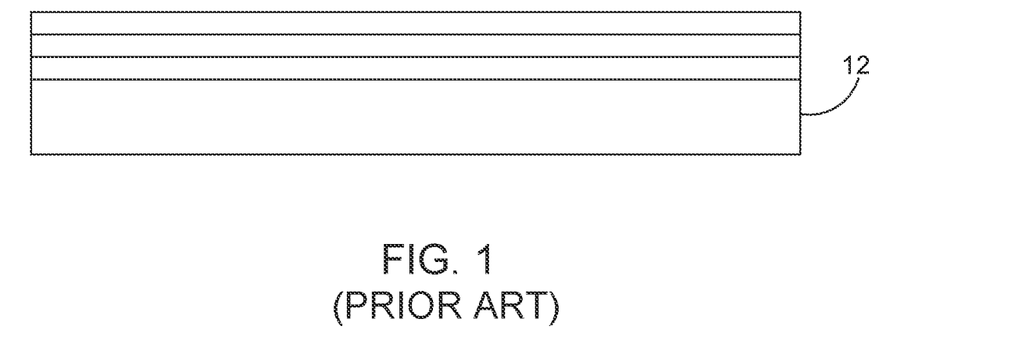
FIG. 1 is a side schematic view of a compressible material, like a mattress, having various layers of material, in its original uncompressed condition.
Figure 2:
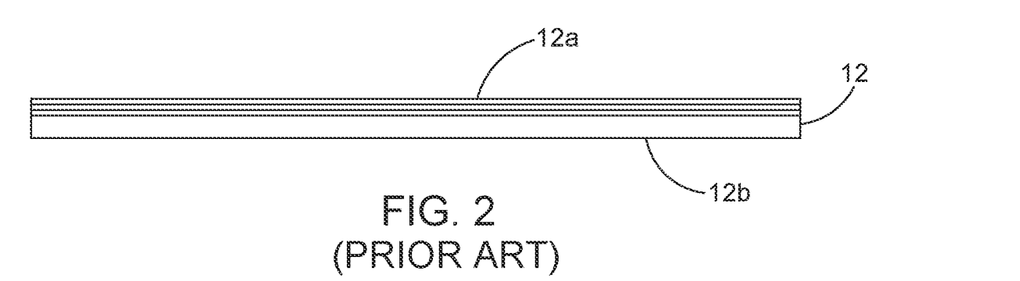
FIG. 2 is a side schematic view of that in FIG. 1, but now in a substantially compressed condition.

To be compressed, such products are also often folded, rolled, folded and rolled, or rolled and rolled, to attain an even smaller package size. The rolling/folding/combination operation is often preceded by a stage of compressing the compressible materials, and in particular a mattress, in order to first reduce the thickness thereof and therefore reduce the maximum diameter of a packaged product when formed into a spiral-rolled product. The compressible product (e.g., as seen in FIG. 1 state of non-compression) is wrapped in loose plastic or plastic-like material, and then compressed in a press, often times highly compressed to a volume six times to twelve times less than its pre-compressed volume (i.e., all this not shown, but as generally known to do by one of ordinary skill in this art). At the end of the compressing action that substantially flattens the once thick material to about 0.5 inch to about 2 inches in height, a welding bar is activated to join and seal the side flaps of the plastic wrapping the mattress product, thus sealing the product inside the plastic from the outside environment, and preventing the mattress from readily expanding back to its pre-compressed height and volume after the press is opened due to the restrictive plastic wrapping (as seen in FIG. 2 state of compression).

Figure 3:
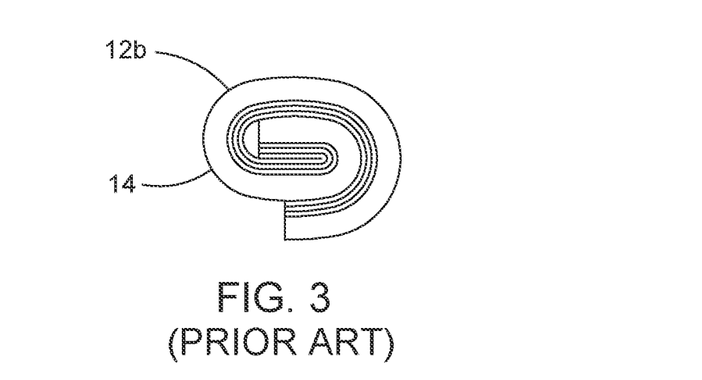
FIG. 3 is a side schematic view of that in FIG. 2 after it has been rolled up using a roll cage machine and process.
Figure 4:
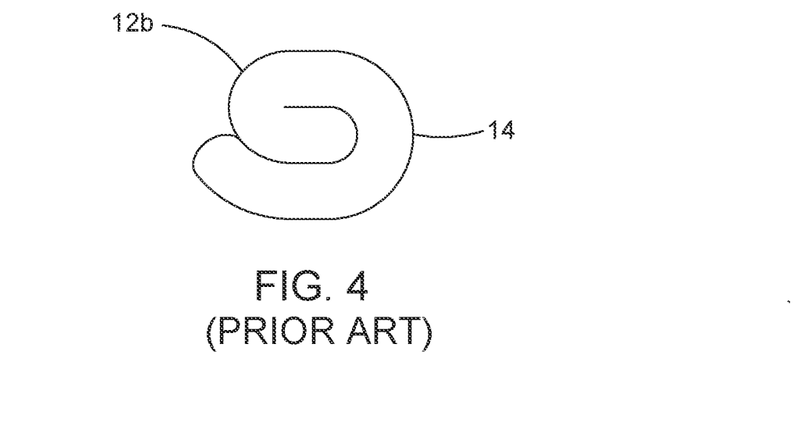
FIG. 4 is a side schematic view of that in FIG. 3 after it has been rolled up using the roll cage machine and process, first as a full length roll and then as a roll of a roll, and before it has paper wrapping materials securing it in that position.

The compressed mattress product then advances along in flattened form to a machine and process for folding and/or spiral-rolling of the product. For example, as seen in FIG. 3, such a spiral roll can be formed by existing rolling equipment, and preferably, bottom surface 12b will be the outside of the rolled up material and can aid to protect the more valuable top surface 12a from damage during roll up, packaging and shipping. Storage of the rolled product can then occur, for example, by insertion in a pre-formed bag or being wrapped with stretch wrap or paper wrap around a circumference of the product as part of the spiral-rolling process near the time rolling of the product concludes in the rolling machine. Additionally, this spiral rolled product can then be subjected to a further rolling process to further reduce the overall size of the rolled material, a so-called roll of a roll, as seen in FIG. 4. All of this is toward the goal of rolling the compressible product wound up on itself in a very tight manner so as to prevent it from occupying too great a volume during transport and storage. The greater the final compression ratio of the product, the cheaper the transport and storage. However, maintaining the tightly wound product to its finish diameter with traditional finishing wrapping materials, of plastic or paper, is often not satisfactory and pre-mature expansion occurs preventing the product from going into a box and/or expansion after the product is in the box causing the box to bulge and/or burst.

Additionally, it is also important for the series of operations, and in particular the rolling process and its finish wrapping which tends to be a bottleneck in an assembly line, to be performed at a sufficient speed to be compatible with the line speeds of the product before and after the rolling step in the production line. This point is particularly important for modern lines whose production capability it is often desired to increase. From this point of view, it is important for the spiral rolling and finish wrapping machine to avoid non-productive times. The ideal rolling and finishing machine is a machine which would wind and finish wrapping the product at the speed at which it passes down the production line without any non-productive time between the end of rolling up one product and the beginning of rolling up the next product.

There are a variety of properties to consider when applying finish wrapping materials, be they the pre-formed bag, stretch wrap or a paper wrap around the circumference of the product, especially a high expansion force product like a rolled compressed material, such as a mattress product, into a smaller product footprint for storage and shipping. Often these properties compete with each other and even move each other in opposite directions. Thus, there is a need to address one or more of the deficiencies in the art to better aid in achieving desirable properties and/or avoid negative ones, toward a finish wrapping that is consistent and reliable for shipment of the high expansion force product in its finish wrapping until it arrives at an end user, who will unpackage and unwrap the tightly compressed and rolled up high expansion force product.

SUMMARY

To address one or more deficiencies in the art and/or better achieve the desirable properties in packaging, storing and/or ultimately using rolled compressible material, there is provided paper wrapping materials to securely wrap a rolled-up High Expansion Force product. The paper wrapping materials include a kraft paper layer encircling a circumference of the product. A leading end of the kraft paper layer is adhered to a tail end of the product by a first hotmelt adhesive located between facing surfaces of the leading end of the kraft paper layer and the tail end of the product. A tail end of the kraft paper layer is adhered to a middle portion of the kraft paper layer with a second hotmelt adhesive located between facing surfaces of the tail end of the kraft paper layer and the middle portion of the kraft paper layer to thereby secure the kraft paper layer encircling the circumference of the product. The kraft paper layer has: (i) a Basis Weight from about 68 pounds per 3000 feet squared to about 84 pounds per 3000 feet squared, (ii) a Tensile Strength (MD) from about 55 pounds per inch to about 70 pounds per inch, (iii) a Stretch (MD) from about 7% to about 11%, and (iv) a fiber content of at least 70% virgin fibers. The second hotmelt adhesive includes between about 15% and about 25% thermoplastic elastomer.

In another aspect there are paper wrapping materials to securely wrap a rolled-up High Expansion Force product. The paper wrapping materials include a kraft paper layer encircling a circumference of the product. A leading end of the kraft paper layer is adhered to a tail end of the product by a first hotmelt adhesive located between facing surfaces of the leading end of the kraft paper layer and the tail end of the product. A tail end of the kraft paper layer is adhered to a middle portion of the kraft paper layer with a second hotmelt adhesive located between facing surfaces of the tail end of the kraft paper layer and the middle portion of the kraft paper layer to thereby secure the kraft paper layer encircling the circumference of the product. The kraft paper layer has: (i) a Basis Weight from about 68 pounds per 3000 feet squared to about 84 pounds per 3000 feet squared, (ii) a Tensile Strength (MD) from about 55 pounds per inch to about 70 pounds per inch, (iii) a Stretch (MD) from about 7% to about 11%, (iv) a TEA (MD) from about 28 foot-pounds per foot squared to about 37 foot-pounds per foot squared, (v) a Tear (CD) from about 170 grams to about 205 grams, and (vi) a fiber content of at least 70% virgin fibers. The second hotmelt adhesive includes between about 15% and about 25% thermoplastic elastomer.

In still another aspect there is a method to securely wrap a rolled-up High Expansion Force product with paper wrapping materials. The method includes encircling a circumference of the product with a kraft paper layer, including adhering a leading end of the kraft paper layer to a tail end of the product by a first hotmelt adhesive located between facing surfaces of the leading end of the kraft paper layer and the tail end of the product. Another step, and preferably in this order, is adhering a tail end of the kraft paper layer to a middle portion of the kraft paper layer with a second hotmelt adhesive located between facing surfaces of the tail end of the kraft paper layer and the middle portion of the kraft paper layer to thereby secure the kraft paper layer encircling the circumference of the product. There is also the step using the kraft paper layer having: (i) a Basis Weight from about 68 pounds per 3000 feet squared to about 84 pounds per 3000 feet squared, (ii) a Tensile Strength (MD) from about 55 pounds per inch to about 70 pounds per inch, (iii) a Stretch (MD) from about 7% to about 11%, and (iv) a fiber content that comprises at least 70% virgin fibers. And, there is the step using the second hotmelt adhesive comprising a composition of between about 15% and about 25% thermoplastic elastomer.

Also described herein are options directed to further features and configurations individually and relative to other aspects, for the kraft paper layer and the hotmelt adhesives, including material properties thereof.

As used herein, "High Expansion Force" means a product that is (i) reduced in volume by flattening it to a flattened volume that is at least two times less than its pre-compressed volume, and preferably reduced to a flattened volume that is at least four times less than its pre-compressed volume, more preferably at least 6 times, at least 8 times or at least 10 times, and (ii) the product is resilient to recover to at least about 90% of its pre-compressed volume, preferably to at least about 95% of its pre-compressed volume and more preferably 98%, when at a temperature of about 70 degrees Fahrenheit for a period of one hour and the restrictive means causing it to be reduced in volume is removed from the product.

BRIEF DESCRIPTION OF THE DRAWINGS

The invention may be more completely understood in consideration of the following detailed description of various embodiments in connection with the accompanying drawings, in which.

The drawings show some but not all embodiments. The elements depicted in the drawings are illustrative and not necessarily to scale, and the same (or similar) reference numbers denote the same (or similar) features throughout the drawings.

DETAILED DESCRIPTION

Figure 5:
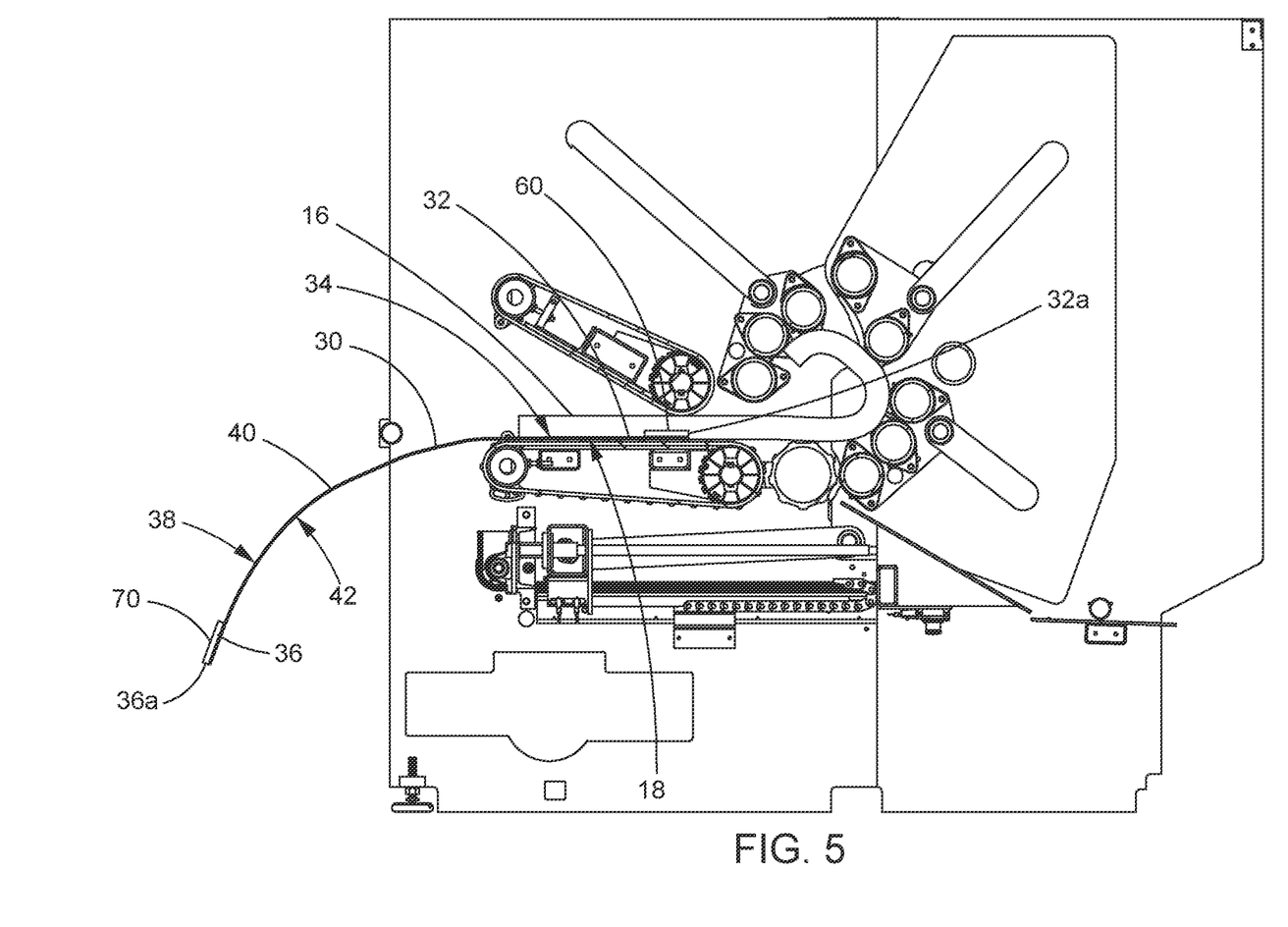
FIG. 5 is cross-sectional schematic side view of an exemplary roll cage machine and process, as the product is passing though the nip and into the roll chamber and being rolled up and with a kraft paper layer secured to the tail end of the product.
Figure 6:
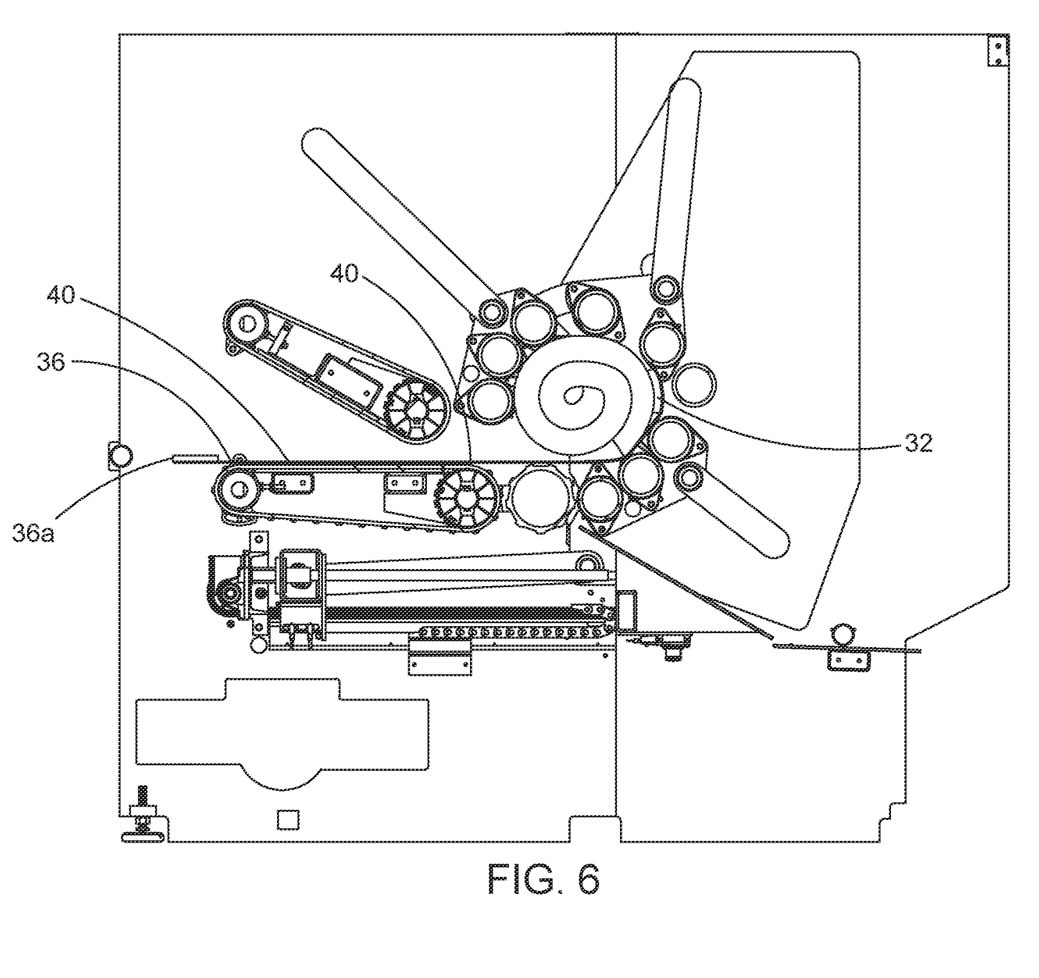
FIG. 6 is a cross-sectional schematic side view similar to that in FIG. 5, but with the product in the roll chamber fully rolled up and the kraft paper layer beginning to encircle the circumference of the product.
Figure 7:
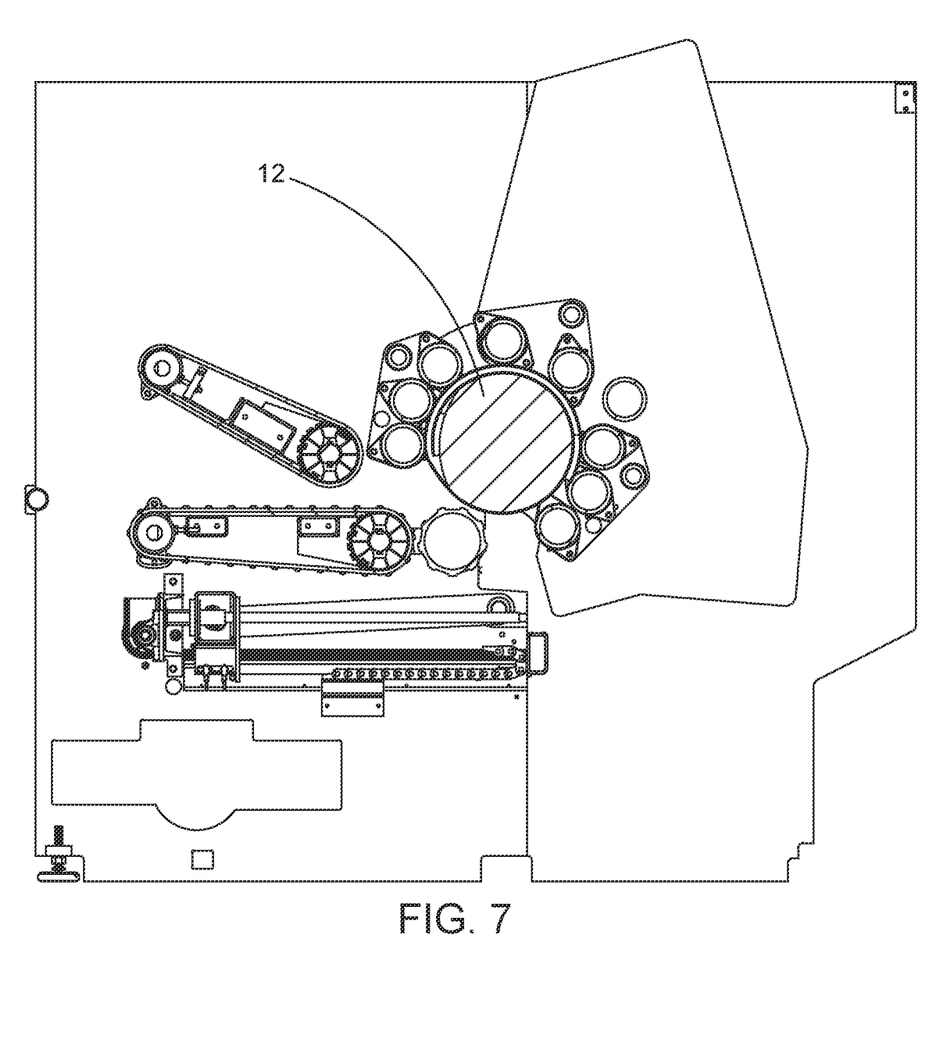
FIG. 7 is a cross-sectional schematic side view similar to that in FIG. 6, but with the product in the roll chamber fully rolled up including its paper wrapping materials securely wrapping the product in its finished wrapping configuration.
Figure 8:
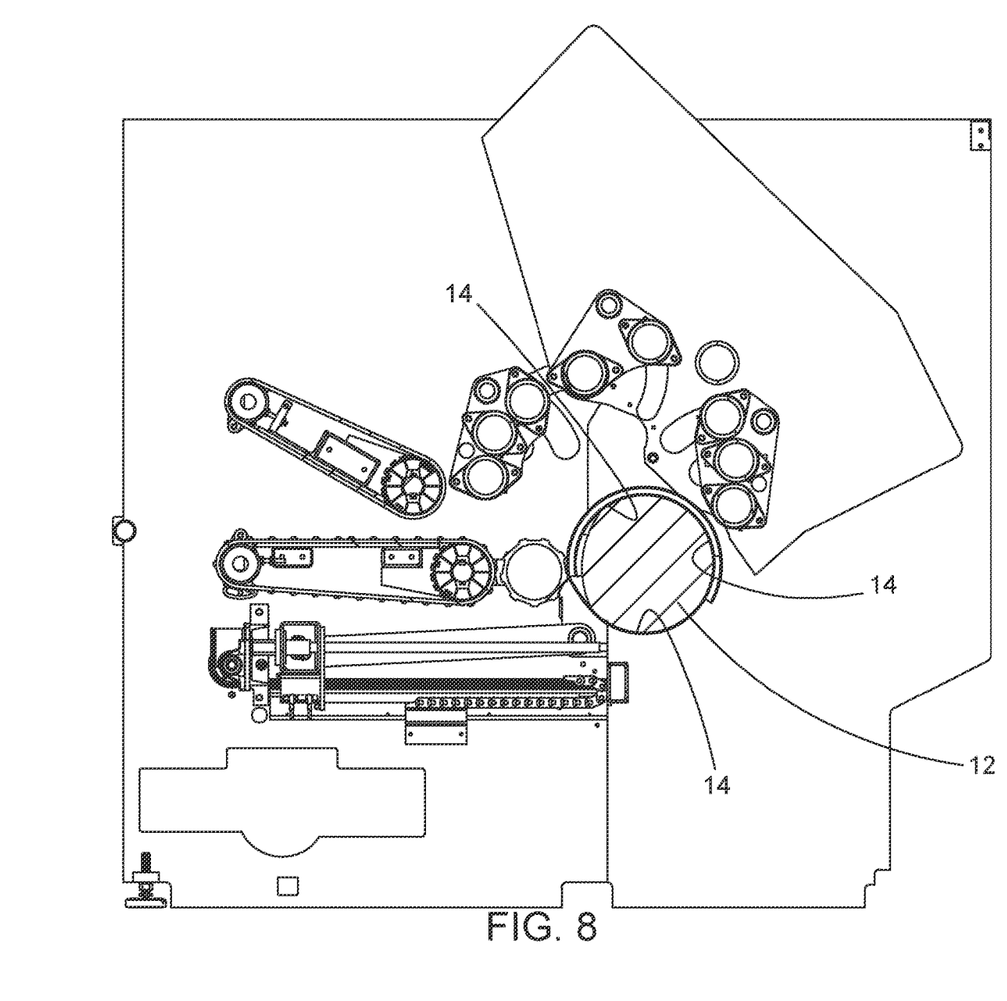
FIG. 8 is a cross-sectional schematic side view of that in FIG. 7, but now with the roll chamber in the open mode as the fully rolled up product is in its finished wrapping configuration and beginning to exit the roll chamber.
Figure 9:
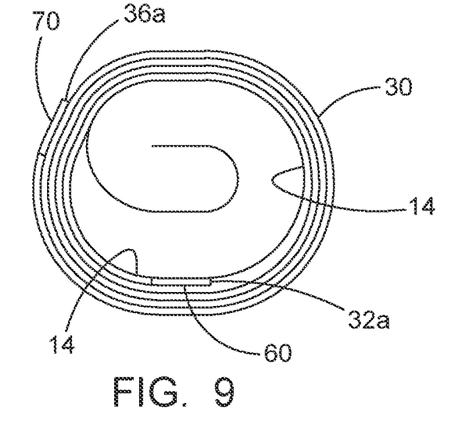
FIG. 9 is an enlarged schematic side view of product like that in FIG. 8, showing an embodiment of the paper wrapping materials with five wraps around the circumference of the product.

In accordance with the practice of at least one embodiment, as seen in FIGS. 5-8 for example, there is paper wrapping materials to securely wrap the rolled-up High Expansion Force product 12. The paper wrapping materials include a kraft paper layer 30 encircling a circumference 14 of the product 12. A leading end 32 of the kraft paper layer 30 is adhered to a tail end 16 of the product 12 by a first hotmelt adhesive 60 located between facing surface 34 of the leading end 32 of the kraft paper layer and facing surface 18 of the tail end 16 of the product. Conventional equipment (not shown) can be used to apply the hotmelt adhesive to surface 34 and/or surface 18 just before the leading end 32 is adhered to the tail end 16, as seen in FIG. 5 moments later. Layer 30 can be a set length of paper fed into the production line or a length of paper measured out in line and cut in process, both of these by a conventional process and equipment (not shown) but readily understood by one of ordinary skill in the art in combination with the teaching herein. The paper wrapping materials further include a tail end 36 of the kraft paper layer 30 adhered to a middle portion 40 of the kraft paper layer with a second hotmelt adhesive 70 located between facing surface 38 of the tail end 36 of the kraft paper layer and the facing surface 42 of the middle portion 40 of the kraft paper layer to thereby secure the kraft paper layer encircling the circumference of the product. Middle portion 40 is any portion of layer 30 in between leading end 32 and tail end 36.

Without being limited to a theory of understanding, the inventors have surprisingly discovered a combination of certain material properties of the kraft paper layer and at least the hotmelt adhesive used as the second hotmelt adhesive, are important to practicing the invention as compared to any existing technology. For example, the inventors trialed and dismissed several paper sheets before arriving at the inventive kraft paper layer. A couple of these failures were Danco™ 60-pound kraft sheet, Ahlstrom Munksjo™ 70-pound national splicing tape and recycled fiber paper sheets. The inventors also trialed and dismissed several hotmelt adhesives before arriving at the hotmelt adhesive material properties important here. A couple of the failures were Technomelt Supra 106M™ and Jowatherm® 266.2

That is, after considerable experimentation, trial and error, the inventors have discovered a range of paper wrapping layer and hotmelt adhesive properties to consistently and reliably securely wrap rolled-up High Expansion Force product, like 12. In particular, the paper layer must have at least (i) a Basis Weight from about 68 pounds per 3000 feet squared to about 84 pounds per 3000 feet squared, (ii) a Tensile Strength (MD) from about 55 pounds per inch to about 70 pounds per inch, (iii) a Stretch (MD) from about 7% to about 11%, and (iv) a fiber content of at least 70% virgin fibers. With this combination of kraft paper layer properties, and the stated ranges for each, the paper wrapping materials are able to securely wrap the rolled-up High Expansion Force product 12 unlike ever before. Such combination of properties give the paper layer some extensibility or stretch without failing, even when, and especially when, two paper layers are adhered together with hotmelt adhesive adhered therebetween. This is important to consistent and reliable performance of the paper layer and adhesive combination to securely wrap the High Expansion Force product, especially when the wrapped product is subject to handling and transportation forces like drops, bumps and products banging together. Even more so, preferably, this is also possible when the product has an End Density from about 26 pounds per cubic foot to about 32 pounds per cubic foot. And, more preferably, the End Density of the product is from about 28 pounds per cubic foot to about 30 pounds per cubic foot.

The End Density of a rolled-up product 12 (e.g., as seen in FIGS. 3-4, and 7-11) is determined using a Roll Cage Calculator ("the RCC"), especially for a rolled-up mattress product. The RCC uses basic geometric and math functions to determine the Start Density of the product before put into a compressed state and then the product's End Density after put into a compressed state and rolled-up as taught herein. Set forth below in Table 1 is sample information to understand how the RCC operates.

TABLE 1

| | Custom Mattress Build | | | | | | | | | |
|---|---|---|---|---|---|---|---|---|---|---|
| | Length | | Width | | Height | | Density | | Weight Per Layer | |
| | [in] | [mm] | [in] | [mm] | [in] | [mm] | [lb/ft^3] | [kg/m^3] | [lbs] | [kg] |
| Layer 1 | 80 | 2032 | 76 | 1930 | 12 | 305 | 3 | 48.06 | 126.67 | 57.45 |
| Layer 2 | 0 | 0 | 0 | 0 | 0 | 0 | 0 | 0.00 | 0.00 | 0.00 |
| Layer 3 | 0 | 0 | 0 | 0 | 0 | 0 | 0 | 0.00 | 0.00 | 0.00 |
| Layer 4 | 0 | 0 | 0 | 0 | 0 | 0 | 0 | 0.00 | 0.00 | 0.00 |
| Finished Size | 80 | 2032 | 76 | 1930 | 12 | 305 | | Total Weight | 126.67 | 57.45 |

| | Machine Values | | | Finished Product | | |
|---|---|---|---|---|---|---|
| Parameters | Imperial | Metric | Expansion | Imperial | Metric | |
| Diameter [in, mm] | 16 | 406.4 | 1.00 | 17.00 | 431.8 | |
| Roll length [in, mm] | 40 | 1016.0 | | 40 | 1016.0 | |
| Start Volume [ft3, m3] | 42.22 | 1.195 | | 42.22 | 1.195 | |
| End Volume [ft3, m3] | 4.65 | 0.132 | | 5.25 | 0.149 | |
| Volume change | 9.08 | 9.08 | <10 [Imperial] | 8.04 | 8.04 | <10 [Imperial] |
| Start Density [lb/ft3, kg/m3] | 3.00 | 48.08 | | 3.00 | 48.08 | |
| End Density [lb/ft3, kg/m3] | 27.23 | 436.43 | <30 [Imperial] | 24.12 | 386.59 | <25 [Imperial] |

The first step to using the RCC is to measure the material of the product to be rolled up and note its—Length, Width, Height and Weight, from which its Density can be calculated or if known that can be readily accepted. This is done for each layer of material of the to-be-rolled up product, e.g., a mattress, in the Custom Mattress Build area of Table 1. This is gathered from the pre-compressed material size and weight. Next is to identify the "Diameter" of the roll chamber desired and note it in the Parameters section (e.g., using applicant's U.S. patent application Ser. No. 17/081, 639, filed Oct. 27, 2020 and titled: VARIABLE ROLL CAGE MACHINE AND PROCESS). In this example it is 16 inches, Imperial scale. Next, identify the desired "Roll length" of the mattress, i.e., the rolled up length of the fully rolled product once finished being rolled up in the roll chamber. Note, if the material is going to be rolled in its full length (e.g., 80 inches in this example), the "Roll length" value should mirror the desired finished size of the rolled up product (e.g., the FIG. 3 material rolled configuration). However, if the material is going to be rolled to less than its full length (e.g., 40 inches in this example, and as noted in the Roll length box of the Parameters for the Machine Values), the "Roll length" value should be half of the finished size of the rolled up product, as the upstream equipment folds the material in half, or maybe even thirds, before entry into the roll chamber (e.g., not shown but similar to FIG. 3 material rolled configuration if doubled onto itself).

Turning to the lower half of Table 1, next is to identify the "Expansion" value to indicate how much the product is expected to expand after being rolled up and with the paper wrapping materials securely wrapped thereto. In this example, it is 1 inch. This value is dependent on the nature of the material and the other factors described here like number of wrappings, expansion force of the rolled up material and End Density described below. Next is calculating the "End Volume" as a function of the volume of the roll chamber that will be occupied by the rolled up product (i.e., the diameter of the roll chamber when the product is finished rolling up). That is, using the conventional formula to determine the volume of a cylinder ($v=\pi r^2 h$), then in this example where r=0.667 ft and h=3.334, End Volume is 4.65.

Next, is calculating the "Volume change" of the material from its pre-compressed condition (Start Volume 42.22 feet cubed in this example) to its volume when fully rolled up (End Volume 4.65 feet cubed in this example, as this is all the space it will get when it completely enters the roll chamber) as a simple ratio, i.e., pre-compressed volume divided by fully rolled up volume to arrive at 9.08 in this example. Preferably the Volume change is in the range of 6 to 12, and more preferably about 8 to 10. Next is calculating the "End Density" (i.e., mass over volume) as a function of the "Start Density" (3.0 pounds per feet cubed in this example, the pre-compressed value) times the Volume change (9.08 in this example), to get 27.23 pounds per foot cubed in this example. Preferably the End Density of the rolled up product inside the paper wrapping materials is in the range of 20 pounds per cubic foot to 35 pounds per foot cubed, more preferably about 26 pounds per cubic foot to about 32 pounds per cubic foot, and most preferably about 28 pounds per cubic foot to about 30 pounds per cubic foot. The "Diameter" of the Finished Product is the diameter of the final package, taking Expansion into account. It is calculated as the sum of the roll chamber Diameter and Expansion. Summarizing, the desired parameters here help better aid the rolled-up product not being damaged during roll up and the product maintaining more of the desired in use characteristics after packaging, shipping and then unpacking and use.

Using the above explanation, for added understanding of how to practice preferred aspects of the invention with rolled-up product 12, several examples in paired sets are now discussed. The first table in each set identifies an undesirable situation because one or both of the Volume change and End Density for a particular roll chamber diameter could be harmful to the product being rolled up. The second table in each set identifies an exemplary desirable situation because both of the Volume change and End Density for a particular roll chamber diameter will not be harmful to the product 12 being rolled up. When there are multiple layers, the Start Density is a weighted average of all the layers, and the other values and calculations are made in accordance with the teaching for Table 1.

In Table 2A, there is a 3 layer king size mattress folded in half and proposed to be rolled up at 9.5 inches for the roll chamber diameter in its final position. Shown in the Volume change and End Density numbers, this is not a desirable roll chamber diameter. Keeping everything constant but changing the roll chamber diameter to 13 inches for its final position, then in Table 2B a desirable result is produced as evidenced by the Volume change and End Density numbers in the preferred ranges.

TABLE 2A

| | Custom Mattress Build | | | | | | | | | |
|---|---|---|---|---|---|---|---|---|---|---|
| | Length | | Width | | Height | | Density | | Weight Per Layer | |
| | [in] | [mm] | [in] | [mm] | [in] | [mm] | [lb/ft^3] | [kg/m^3] | [lbs] | [kg] |
| Layer 1 | 80 | 2032 | 76 | 1930 | 6.0 | 152 | 1.80 | 28.83 | 38.00 | 17.24 |
| Layer 2 | 80 | 2032 | 76 | 1930 | 1.0 | 25 | 2.00 | 32.04 | 7.04 | 3.19 |
| Layer 3 | 80 | 2032 | 76 | 1930 | 2.0 | 51 | 3.00 | 48.06 | 21.11 | 9.58 |
| Layer 4 | 0 | 0 | 0 | 0 | 0.0 | 0 | 0.00 | 0.00 | 0.00 | 0.00 |
| Finished Size | 80 | 2032 | 76 | 1930 | 9 | 229 | | Total Weight | 66.15 | 30.00 |

| | Primary Roll Cage | | | | |
|---|---|---|---|---|---|
| | Machine Values | | | Finished Product | |
| Parameters | Imperial | Metric | Expansion | Imperial | Metric |
| Diameter [in, mm] | 9.5 | 241.3 | 1.00 | 10.50 | 266.7 |
| Roll length [in, mm] | 40 | 1016 | | 40 | 1016 |
| Start Volume [ft3, m3] | 31.67 | 0.896 | | 31.67 | 0.896 |

TABLE 2A-continued

| | | | | | | |
|---|---|---|---|---|---|---|
| End Volume [ft3, m3] | 1.64 | 0.046 | | 2.00 | 0.057 | |
| Volume change | 19.31 | 19.31 | <10 [Imperial] | 15.81 | 15.81 | <10 [Imperial] |
| Start Density [lb/ft3, kg/m3] | 2.09 | 33.48 | | 2.09 | 33.48 | |
| End Density [lb/ft3, kg/m3] | 40.34 | 646.49 | <30 [Imperial] | 33.02 | 529.21 | <25 [Imperial] |

TABLE 2B

| | Custom Mattress Build | | | | | | | | |
|---|---|---|---|---|---|---|---|---|---|
| | Length | | Width | | Height | | Density | | Weight Per Layer | |
| | [in] | [mm] | [in] | [mm] | [in] | [mm] | [lb/ft^3] | [kg/m^3] | [lbs] | [kg] |
| Layer 1 | 80 | 2032 | 76 | 1930 | 6.0 | 152 | 1.80 | 28.83 | 38.00 | 17.24 |
| Layer 2 | 80 | 2032 | 76 | 1930 | 1.0 | 25 | 2.00 | 32.04 | 7.04 | 3.19 |
| Layer 3 | 80 | 2032 | 76 | 1930 | 2.0 | 51 | 3.00 | 48.06 | 21.11 | 9.58 |
| Layer 4 | 0 | 0 | 0 | 0 | 0.0 | 0 | 0.00 | 0.00 | 0.00 | 0.00 |
| Finished Size | 80 | 2032 | 76 | 1930 | 9 | 229 | | Total Weight | 66.15 | 30.00 |

| | Primary Roll Cage | | | | |
|---|---|---|---|---|---|
| | Machine Values | | | Finished Product | |
| Parameters | Imperial | Metric | Expansion | Imperial | Metric |
| Diameter [in, mm] | 13 | 330.2 | 1.00 | 14.00 | 355.6 |
| Roll length [in, mm] | 40 | 1016 | | 40 | 1016 |
| Start Volume [ft3, m3] | 31.67 | 0.896 | | 31.67 | 0.896 |
| End Volume [ft3, m3] | 3.07 | 0.087 | | 3.56 | 0.101 |
| Volume change | 10.31 | 10.31 | <10 [Imperial] | 8.89 | 8.89 | <10 [Imperial] |
| Start Density [lb/ft3, kg/m3] | 2.09 | 33.48 | | 2.09 | 33.48 |
| End Density [lb/ft3, kg/m3] | 21.54 | 345.24 | <30 [Imperial] | 18.57 | 297.68 | <25 [Imperial] |

In Table 3A, there is a 4 layer queen size mattress folded in half and proposed to be rolled up at 8.5 inches for the roll chamber diameter in its final position. Shown in the Volume change and End Density numbers, this is not a desirable roll chamber diameter. Keeping everything constant but changing the roll chamber diameter to 12 inches for its final position, then in Table 3B a desirable result is produced as evidenced by the Volume change and End Density numbers in the preferred ranges.

TABLE 3A

| | Custom Mattress Build | | | | | | | | | |
|---|---|---|---|---|---|---|---|---|---|---|
| | Length | | Width | | Height | | Density | | Weight Per Layer | |
| | [in] | [mm] | [in] | [mm] | [in] | [mm] | [lb/ft^3] | [kg/m^3] | [lbs] | [kg] |
| Layer 1 | 80 | 2032 | 60 | 1524 | 6.0 | 152 | 1.80 | 28.83 | 30.00 | 13.61 |
| Layer 2 | 80 | 2032 | 60 | 1524 | 3.0 | 76 | 2.00 | 32.04 | 16.67 | 7.56 |
| Layer 3 | 80 | 2032 | 60 | 1524 | 2.0 | 51 | 3.00 | 48.06 | 16.67 | 7.56 |
| Layer 4 | 80 | 2032 | 60 | 1524 | 1.0 | 25 | 4.00 | 64.07 | 11.11 | 5.04 |
| Finished Size | 80 | 2032 | 60 | 1524 | 12 | 305 | | Total Weight | 74.44 | 33.77 |

TABLE 3A-continued

| | Primary Roll Cage | | | | | |
|---|---|---|---|---|---|---|
| | Machine Values | | | Finished Product | | |
| Parameters | Imperial | Metric | Expansion | Imperial | Metric | |
| Diameter [in, mm] | 8.5 | 215.9 | 1.00 | 9.50 | 241.3 | |
| Roll length [in, mm] | 40 | 1016 | | 40 | 1016 | |
| Start Volume [ft3, m3] | 33.33 | 0.943 | | 33.33 | 0.943 | |
| End Volume [ft3, m3] | 1.31 | 0.037 | | 1.64 | 0.046 | |
| Volume change | 25.39 | 25.39 | <10 [Imperial] | 20.33 | 20.33 | <10 [Imperial] |
| Start Density [lb/ft3, kg/m3] | 2.23 | 35.80 | | 2.23 | 35.80 | |
| End Density [lb/ft3, kg/m3] | 56.70 | 908.84 | <30 [Imperial] | 45.39 | 727.57 | <25 [Imperial] |

TABLE 3B

| | Custom Mattress Build | | | | | | | | |
|---|---|---|---|---|---|---|---|---|---|
| | Length | | Width | | Height | | Density | | Weight Per Layer | |
| | [in] | [mm] | [in] | [mm] | [in] | [mm] | [lb/ft^3] | [kg/m^3] | [lbs] | [kg] |
| Layer 1 | 80 | 2032 | 60 | 1524 | 6.0 | 152 | 1.80 | 28.83 | 30.00 | 13.61 |
| Layer 2 | 80 | 2032 | 60 | 1524 | 3.0 | 76 | 2.00 | 32.04 | 16.67 | 7.56 |
| Layer 3 | 80 | 2032 | 60 | 1524 | 2.0 | 51 | 3.00 | 48.06 | 16.67 | 7.56 |
| Layer 4 | 80 | 2032 | 60 | 1524 | 1.0 | 25 | 4.00 | 64.07 | 11.11 | 5.04 |
| Finished Size | 80 | 2032 | 60 | 1524 | 12 | 305 | | Total Weight | 74.44 | 33.77 |

| | Primary Roll Cage | | | | | |
|---|---|---|---|---|---|---|
| | Machine Values | | | Finished Product | | |
| Parameters | Imperial | Metric | Expansion | Imperial | Metric | |
| Diameter [in, mm] | 12 | 304.8 | 1.00 | 13.00 | 330.2 | |
| Roll length [in, mm] | 40 | 1016 | | 40 | 1016 | |
| Start Volume [ft3, m3] | 33.33 | 0.943 | | 33.33 | 0.943 | |
| End Volume [ft3, m3] | 2.62 | 0.074 | | 3.07 | 0.087 | |
| Volume change | 12.74 | 12.74 | <10 [Imperial] | 10.85 | 10.85 | <10 [Imperial] |
| Start Density [lb/ft3, kg/m3] | 2.23 | 35.80 | | 2.23 | 35.80 | |
| End Density [lb/ft3, kg/m3] | 28.45 | 456.00 | <30 [Imperial] | 24.24 | 388.54 | <25 [Imperial] |

In Table 4A, there is a 4 layer queen size mattress (15 inch height) folded in half and proposed to be rolled up at 11 inches for the roll chamber diameter in its final position. Shown in the Volume change and End Density numbers, this is not a desirable roll chamber diameter. Keeping everything constant but changing the roll chamber diameter to 14 inches for its final position, then in Table 4B a still desirable result is produced as evidenced by the Volume change and End Density numbers in the preferred ranges.

TABLE 4A

| | Custom Mattress Build | | | | | | | | |
|---|---|---|---|---|---|---|---|---|---|
| | Length | | Width | | Height | | Density | | Weight Per Layer | |
| | [in] | [mm] | [in] | [mm] | [in] | [mm] | [lb/ft^3] | [kg/m^3] | [lbs] | [kg] |
| Layer 1 | 80 | 2032 | 60 | 1524 | 6.0 | 152 | 1.80 | 28.83 | 30.00 | 13.61 |
| Layer 2 | 80 | 2032 | 60 | 1524 | 4.0 | 102 | 1.80 | 28.83 | 20.00 | 9.07 |

TABLE 4A-continued

| | | | | | | | | | |
|---|---|---|---|---|---|---|---|---|---|
| Layer 3 | 80 | 2032 | 60 | 1524 | 3.0 | 76 | 3.00 | 48.06 | 25.00 | 11.34 |
| Layer 4 | 80 | 2032 | 60 | 1524 | 2.0 | 51 | 4.00 | 64.07 | 22.22 | 10.08 |
| Finished Size | 80 | 2032 | 60 | 1524 | 15 | 381 | Total Weight | | 97.22 | 44.10 |

| | Primary Roll Cage | | | | |
|---|---|---|---|---|---|
| | Machine Values | | | Finished Product | |
| Parameters | Imperial | Metric | Expansion | Imperial | Metric |
| Diameter [in, mm] | 11 | 279.4 | 1.00 | 12.00 | 304.8 |
| Roll length [in, mm] | 40 | 1016 | | 40 | 1016 |
| Start Volume [ft3, m3] | 41.67 | 1.179 | | 41.67 | 1.179 |
| End Volume [ft3, m3] | 2.20 | 0.062 | | 2.62 | 0.074 |
| Volume change | 18.95 | 18.95 | <10 [Imperial] | 15.92 | 15.92 | <10 [Imperial] |
| Start Density [lb/ft3, kg/m3] | 2.33 | 37.40 | | 2.33 | 37.40 |
| End Density [lb/ft3, kg/m3] | 44.22 | 708.71 | <30 [Imperial] | 37.15 | 595.52 | <25 [Imperial] |

TABLE 4B

| Custom Mattress Build | | | | | | | | | |
|---|---|---|---|---|---|---|---|---|---|
| | Length | | Width | | Height | | Density | | Weight Per Layer | |
| | [in] | [mm] | [in] | [mm] | [in] | [mm] | [lb/ft^3] | [kg/m^3] | [lbs] | [kg] |
| Layer 1 | 80 | 2032 | 60 | 1524 | 6.0 | 152 | 1.80 | 28.83 | 30.00 | 13.61 |
| Layer 2 | 80 | 2032 | 60 | 1524 | 4.0 | 102 | 1.80 | 28.83 | 20.00 | 9.07 |
| Layer 3 | 80 | 2032 | 60 | 1524 | 3.0 | 76 | 3.00 | 48.06 | 25.00 | 11.34 |
| Layer 4 | 80 | 2032 | 60 | 1524 | 2.0 | 51 | 4.00 | 64.07 | 22.22 | 10.08 |
| Finished Size | 80 | 2032 | 60 | 1524 | 15 | 381 | Total Weight | | 97.22 | 44.10 |

| | Primary Roll Cage | | | | |
|---|---|---|---|---|---|
| | Machine Values | | | Finished Product | |
| Parameters | Imperial | Metric | Expansion | Imperial | Metric |
| Diameter [in, mm] | 14 | 355.6 | 1.00 | 15.00 | 381 |
| Roll length [in, mm] | 40 | 1016 | | 40 | 1016 |
| Start Volume [ft3, m3] | 41.67 | 1.179 | | 41.67 | 1.179 |
| End Volume [ft3, m3] | 3.56 | 0.101 | | 4.09 | 0.116 |
| Volume change | 11.70 | 11.70 | <10 [Imperial] | 10.19 | 10.19 | <10 [Imperial] |
| Start Density [lb/ft3, kg/m3] | 2.33 | 37.40 | | 2.33 | 37.40 |
| End Density [lb/ft3, kg/m3] | 27.30 | 437.52 | <30 [Imperial] | 23.78 | 381.13 | <25 [Imperial] |

Related to and building upon one or more of these points for the product 12 and/or its kraft paper layer 30, certain aspects are directed to the hotmelt adhesive. In particular, at least the second hotmelt adhesive must include between about 15% and about 25% thermoplastic elastomer. Without being limited to a theory of understanding, the elastomer gives the adhesive a rubber-like characteristic and some flexibility or stretch without failing, even when in a set condition adhered between two paper layers. This is important to consistent and reliable performance of the adhesive and paper layer combination securely wrapping the High Expansion Force product, especially when subject to handling and transportation forces like drops, bumps and products banging together. Further in this regard, the second hotmelt adhesive preferably includes between about 18% and about 22% thermoplastic elastomer, and more preferably includes about 20% thermoplastic elastomer. The thermoplastic elastomer can be a SIS (styrene-isoprene-styrene block copolymer) composition. After experimentation with different hotmelt adhesives and their compositions, as noted earlier for failures, hotmelt adhesives contemplated for the paper wrapping materials practiced here can have this material composition formula, in addition to the thermoplastic elastomer: between about 55% and about 65% of tackifying resin and between about 15% and about 25% plasticizer. When made, such hotmelt adhesives can have a (i) viscosity Brookfield @ 140 degrees Celsius of 6,000 MPAS to 11,000 MPAS (under ASTM D3236) and (ii) an R&B softening point (glycerine) of 76 C to 94 C (under ASTM E28—for example, running the test (e.g., with an HRB 754 Ring & Ball tester to determine the softening point) in the lab for a sample of the adhesive immersed in a glycol (glycerine) bath and the actual temperature taken). One exemplary such adhesive is Savare E69™ available from Savare Speciality Adhesives LLC of Delaware, Ohio, and specifically known as HOT-MELT 2100001 SAFEMELT 2100001™.

Turning to other features of the hotmelt adhesive, and building upon the combination of features and interactions between them, preferably the second hot melt adhesive has an Adhesive Set Time of between 15 seconds and 30 seconds, and more preferably 15 seconds to 25 seconds. For example, this can be advantageous because as of the instant the second hotmelt adhesive contacts the tail end of the kraft paper layer the adhesive begins to harden and will then be fully set within the desired dwell time in the roll cage before the roll cage wrapping pressure ends and the roll cage opens to expel the finish wrapped product. Generally, the Adhesive Set Time is the measure of time it takes for the hotmelt adhesive, at its as-applied temperature when it lands on the kraft paper layer, to reach its set point temperature at the interface between the hotmelt adhesive and the kraft paper layer to which it is applied. More specifically, the set point temperature is that temperature at which the hotmelt adhesive returns to its solid state to thereby cause the adjacent surfaces of the paper layer with adhesive therebetween to be adhered to one another and securely wrap the rolled-up High Expansion Force product as a finish wrapped product. Further in this regard, preferably, the second hot melt adhesive is in a swirl pattern, like pattern 72 seen in FIG. 13. The swirl pattern can be in the machine direction, the cross-machine direction or a combination of machine and cross-machine directions. Machine direction and cross-machine direction is related to the movement path of the paper layer as it is used herein. Still further, preferably, the first hot melt adhesive and the second hot melt adhesive are the same type of hot melt adhesive. As another example, preferably the second hotmelt adhesive 70 is present in an amount of 0.02 grams per square inch to 0.12 grams per square inch. More preferably, the second hotmelt adhesive is present in an amount of 0.03 grams per square inch to 0.08 grams per square inch.

Figure 10:
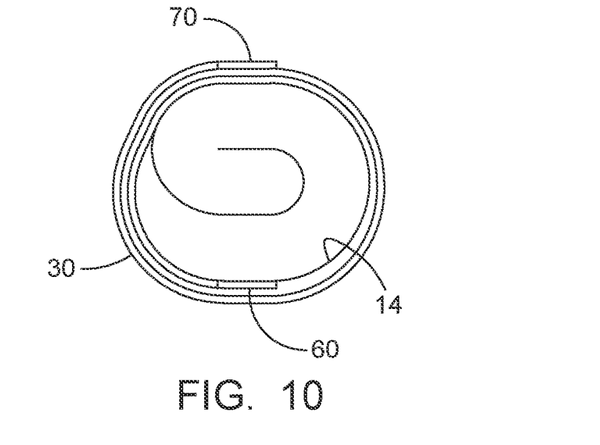
FIG. 10 is a schematic side view of product like that in FIG. 9, showing an alternate embodiment of the paper wrapping materials with one and a half wraps around the circumference of the product.
Figure 11:
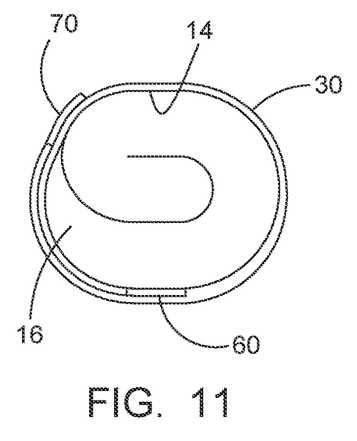
FIG. 11 a schematic side view of product like that in FIG. 10, showing yet another alternate embodiment of the paper wrapping materials with more than one and less that two wraps around the circumference of the product.
Figure 12:
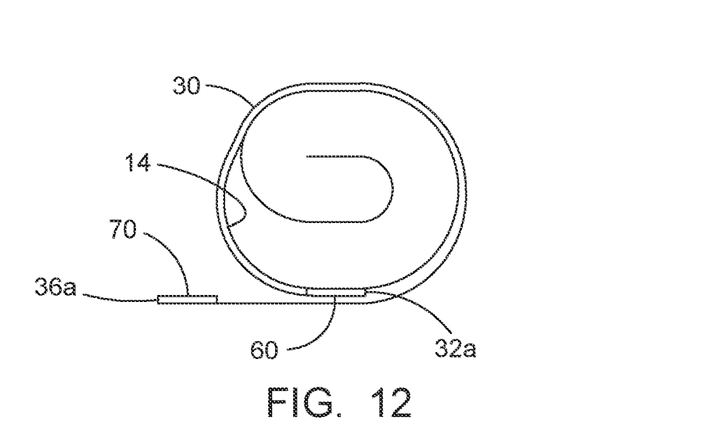
FIG. 12 a schematic side view of product like that in FIGS. 7-11, showing just before the tail end of the kraft paper layer is adhered to the middle portion of the kraft paper layer; and, FIG. 13 a top schematic view of the product seen in FIG. 12, looking down on the adhesive swirl pattern the second hotmelt adhesive can have as applied onto the tail end of the paper layer.
Figure 13:
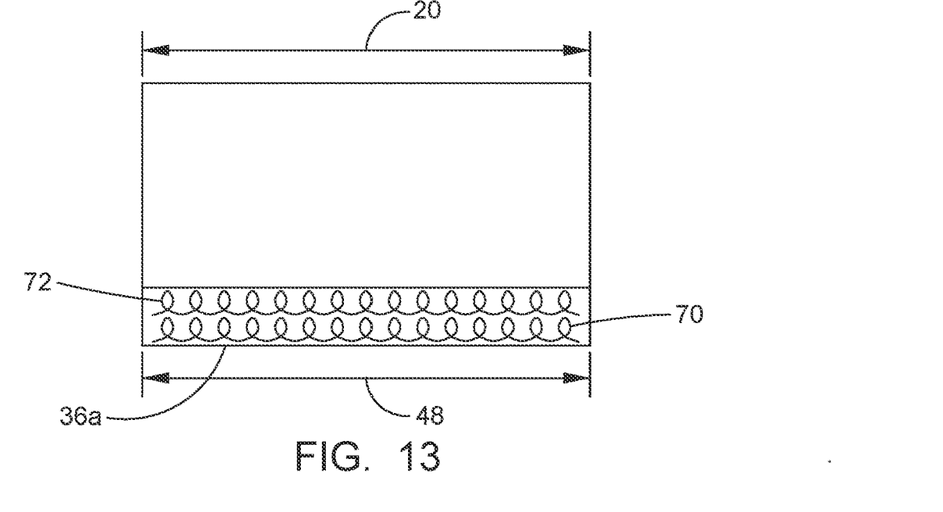

Considering other features of the paper wrapping materials, it can be advantageous to use less materials and yet still obtain the secure wrap needed for the rolled-up High Expansion Force product. That is, preferably the kraft paper layer encircles the product between 1.5 and 5 times around the circumference 14 of the product, as measured from a leading edge 32a of the leading end 32 of the kraft paper layer to a tail edge 36a of the tail end 36 of the kraft paper layer, seen in FIG. 9 with up to five wraps around the circumference. More preferably, as seen in FIG. 10 with three wraps, the kraft paper layer encircles the product between 1.5 and 3 times around the circumference of the product. Additionally, or alternatively, at least one wrap of the kraft paper layer around the circumference 14 is essentially free of hotmelt adhesive between adjacent kraft paper layers that encircle the product. In related regards, preferably the kraft paper layer has a width dimension 48 about the same as a length dimension 20 of the finish rolled product 12, as seen in FIG. 13. And additionally, or alternatively, preferably the kraft paper layer width dimension 48 is at least as long as the length dimension 20 of the finish rolled product, for example when it is desirable to have extra width to the paper layer to fold over around the ends of the product inside a final packaging like a box or other carton material on which branding and/or consumer information can be placed.

In other regards, additional preferred features of the paper wrapping materials are directed to other properties of the kraft paper layer. For example, in addition to the paper layer have virgin fiber content of at least 70%, preferably, in order of increasing preference, the fiber content is at least 80%, 90%, 95%, 98% or even 100% virgin fiber (i.e., first use fiber and not recycled). In further regard, preferably the kraft paper layer is unbleached kraft fiber. More preferably, the kraft paper layer is unbleached natural kraft fiber. Still more preferably, the kraft paper layer can have a fiber content that consists essentially of unbleached natural kraft fibers. An exemplary kraft paper layer is available from Premium 1 Papers of Kelowna, British Colombia, and known as SPX®-Vector. Additionally, the inventors have spent a lot of time and effort to discover and define these acceptable kraft paper layer properties, and no other existing paper layers are known to have such properties. That said, by having the right characteristics and material properties now defined, one of ordinary skill in the art of paper making in combination with this teaching can make other paper layer samples that will be acceptable to practice the invention.

Building upon other properties of the kraft paper layer, and without being limited to a theory of understanding, the inventors have further discovered particular aspects of certain material properties of the kraft paper layer, discussed previously, that are important to practicing the invention as compared to existing technology. For example, as concerns the Tensile Strength (MD) of the kraft paper layer, preferably it is from about 60 pounds per inch to about 65 pounds per inch. Tensile Strength (MD), that is, Tensile Strength in the Machine Direction (MD) of the way the kraft paper layer is manufactured, is preferably measured according to the ISO 1924-3 test employing standard test protocols.

As another example of the important paper layer material properties, preferably the Basis Weight of the kraft paper layer is from about 70 pounds per 3000 feet squared to about 80 pounds per 3000 feet squared. More preferably, the Basis Weight is from has about 72 pounds per 3000 feet squared to about 76 pounds per 3000 feet squared. Basis Weight of the kraft paper layer is preferably measured according to the ISO 536 test employing standard test protocols.

As yet another example of the important paper layer material properties, preferably the Stretch (MD) of the kraft paper layer is about 9%. Stretch (MD), that is, Stretch in the Machine Direction (MD) of the way the kraft paper layer is manufactured and then used, is preferably measured according to the ISO 1924-3 test employing standard test protocols.

As an example of other paper layer material properties that can aid practice of the paper wrapping materials, preferably the kraft paper layer has a TEA (MD) from about 28 foot-pounds per foot squared to about 37 foot-pounds per foot squared. More preferably, the TEA (MD) is from about 30 foot-pounds per foot squared to about 35 foot-pounds per foot squared. TEA (MD), that is, TEA in the Machine Direction (MD) of the way the kraft paper layer is manufactured and used, is preferably measured according to the ISO 1924-3 test employing standard test protocols.

As still another example of other paper layer material properties that can aid practice of the paper wrapping materials, preferably the kraft paper layer has a Tear (CD) from about 170 grams to about 205 grams. More preferably, the Tear (CD) is from about 180 grams to about 195 grams. Tear (CD), that is, Tear in the Cross-machine Direction (CD) of the way the kraft paper layer is manufactured and used, is preferably measured according to the ISO 1974 test employing standard test protocols.

As yet still another example of other paper layer material properties that can aid practice of the paper wrapping materials, preferably the kraft paper layer is a Recyclable paper layer. Recyclable is preferably defined and measured according to the ASTMD6868 test employing standard test protocols. And further, it is this recyclable property that can be particularly advantageous and desired in today's packaging environment that uses so much packaging, especially non-environmentally friendly plastic, oil based packaging.

As used herein, "ISO 1924-3" is specifically referring to Test Method ISO 1924-3: 2005. This part of ISO 1924 specifies a method for measuring the tensile strength, strain at break, tensile energy absorption and tensile stiffness, using a testing machine operating with a constant rate of elongation (100 mm/min). To the degree the test protocol is not uniquely called out in the test for a particular material property, the following guidance in this paragraph is employed to give certainty to one of ordinary skill in the art. A test piece of given dimensions is strained to break at a constant rate of elongation using a conventional testing machine that automatically records both the tensile force and the elongation. From the recorded data, the tensile strength, the strain at break, the tensile energy absorption and the tensile stiffness are calculated. The specimens of paper are conditioned as specified in ISO 554-1976 (23±1° C., 50±2% RH), and keep them in the conditioning atmosphere throughout the test. Preparation of test pieces is as follows: (i) from specimens of undamaged paper, cut test pieces with a width of 15.0 mm±0.1 mm and long enough to be clamped in the clamps; (ii) avoid touching with a bare hand the part of the test piece to be placed between the clamps, avoiding watermarks, folds and wrinkles as well; (iii) ensure that the test pieces are representative of the sample to be tested; (iv) the long edges of the test pieces shall be straight, parallel to within ±0.1 mm over the total clamping length, cleanly cut and undamaged; (v) cut a sufficient number of test pieces to enable at least 10 tests to be made in each direction of interest (machine direction, cross direction). Then the procedure can be as follows: (i) place the test piece in the clamps without straining it and so that any observable slack is eliminated; (ii) avoid touching the test area between the clamps with the fingers; (iii) align and tightly clamp the test piece and perform the test; (iv) test at least 10 test pieces in each direction of interest (machine direction, cross direction), (v) reject all readings for test pieces that break within 2 mm of the clamping lines. The measurement is as applicable: (i) tensile strength measured in 'kN/m'; (ii) elongation at break (stretch) in '%', and (iii) TEA in 'J/m$^2$'. And, precision can be as follows: (i) results from repeated measurements, under normal laboratory conditions using test pieces from the same gross sample, have a coefficient of variation for tensile strength of the order of 3%-5% depending on the paper grade, whereas (ii) the coefficient of variation for tensile energy absorption is of the order of 5%-10%.

Additional discussion of embodiments in various scopes now follows:
- A. Paper wrapping materials to securely wrap a rolled-up High Expansion Force product. The materials including a kraft paper layer encircling a circumference of the product, and a leading end of the kraft paper layer adhered to a tail end of the product by a first hotmelt adhesive located between facing surfaces of the leading end of the kraft paper layer and the tail end of the product. The materials also including a tail end of the kraft paper layer adhered to a middle portion of the kraft paper layer with a second hotmelt adhesive located between facing surfaces of the tail end of the kraft paper layer and the middle portion of the kraft paper layer to thereby secure the kraft paper layer encircling the circumference of the product. The kraft paper layer has: (i) a Basis Weight from about 68 pounds per 3000 feet squared to about 84 pounds per 3000 feet squared, (ii) a Tensile Strength (MD) from about 55 pounds per inch to about 70 pounds per inch, (iii) a Stretch (MD) from about 7% to about 11%, and (iv) a fiber content that includes at least 70% virgin fibers. The second hotmelt adhesive includes between about 15% and about 25% thermoplastic elastomer.
- B. The paper wrapping materials of any of the prior embodiments, wherein the product has a End Density from about 26 pounds per cubic foot to about 32 pounds per cubic foot.
- C. The paper wrapping materials of any of the prior embodiments, wherein the End Density is from about 28 pounds per cubic foot to about 30 pounds per cubic foot.
- D. The paper wrapping materials of any of the prior embodiments, wherein the second hotmelt adhesive is present in an amount of 0.02 grams per square inch to 0.12 grams per square inch.
- E. The paper wrapping materials of any of the prior embodiments, wherein the second hotmelt adhesive is present in an amount of 0.03 grams per square inch to 0.08 grams per square inch.
- F. The paper wrapping materials of any of the prior embodiments, wherein the second hotmelt adhesive comprises between about 18% and about 22% thermoplastic elastomer.
- G. The paper wrapping materials of any of the prior embodiments, wherein the second hotmelt adhesive comprises about 20% thermoplastic elastomer.
- H. The paper wrapping materials of any of the prior embodiments, wherein the second hot melt adhesive has an Adhesive Set Time of between 15 seconds and 30 seconds.
- I. The paper wrapping materials of any of the prior embodiments, wherein the second hot melt adhesive is in a swirl pattern.
- J. The paper wrapping materials of any of the prior embodiments, wherein the first hot melt adhesive and the second hot melt adhesive are the same type of hot melt adhesive.
- K. The paper wrapping materials of any of the prior embodiments, wherein the kraft paper layer encircles the product between 1.5 and 5 times around the circumference of the product as measured from a leading edge of the leading end of the kraft paper layer to a tail edge of the tail end of the kraft paper layer.
- L. The paper wrapping materials of any of the prior embodiments, wherein the kraft paper layer encircles the product between 1.5 and 3 times around the circumference of the product.
- M. The paper wrapping materials of any of the prior embodiments, wherein at least one wrap of the kraft paper layer around the circumference is essentially free of hotmelt adhesive between adjacent kraft paper layers that encircle the product.

N. The paper wrapping materials of any of the prior embodiments, wherein the kraft paper layer comprises unbleached kraft fiber.
O. The paper wrapping materials of any of the prior embodiments, wherein the kraft paper layer comprises unbleached natural kraft fiber.
P. The paper wrapping materials of any of the prior embodiments, wherein the kraft paper layer has a fiber content that consists essentially of unbleached natural kraft fibers.
Q. The paper wrapping materials of any of the prior embodiments, wherein the Tensile Strength (MD) is from about 60 pounds per inch to about 65 pounds per inch.
R. The paper wrapping materials of any of the prior embodiments, wherein the Basis Weight is from about 70 pounds per 3000 feet squared to about 80 pounds per 3000 feet squared.
S. The paper wrapping materials of any of the prior embodiments, wherein the Basis Weight is from about 72 pounds per 3000 feet squared to about 76 pounds per 3000 feet squared.
T. The paper wrapping materials of any of the prior embodiments, wherein the Stretch (MD) is about 9%.
U. The paper wrapping materials of any of the prior embodiments, wherein the kraft paper layer has a TEA (MD) from about 28 foot-pounds per foot squared to about 37 foot-pounds per foot squared.
V. The paper wrapping materials of any of the prior embodiments, wherein the TEA (MD) is from about 30 foot-pounds per foot squared to about 35 foot-pounds per foot squared.
W. The paper wrapping materials of any of the prior embodiments, wherein the kraft paper layer has a Tear (CD) from about 170 grams to about 205 grams.
X. The paper wrapping materials of any of the prior embodiments, wherein the Tear (CD) is from about 180 grams to about 195 grams.
Y. The paper wrapping materials of any of the prior embodiments, wherein the kraft paper layer is a Recyclable paper layer.
Z. The paper wrapping materials of any of the prior embodiments, wherein the fiber content is at least 80% virgin fibers.
AA. The paper wrapping materials of any of the prior embodiments, wherein the fiber content is at least 90% virgin fibers.
BB. The paper wrapping materials of any of the prior embodiments, wherein the kraft paper layer has a width dimension about the same as a length dimension of the finish rolled product.
CC. The paper wrapping materials of any of the prior embodiments, wherein the kraft paper layer has a width dimension at least as long as a length dimension of the finish rolled product.

Each and every document cited in this present application, including any cross referenced or related patent or application, is incorporated in this present application in its entirety by this reference, unless expressly excluded or otherwise limited. The citation of any document is not an admission that it is prior art with respect to any embodiment disclosed in this present application or that it alone, or in any combination with any other reference or references, teaches, suggests, or discloses any such embodiment. Further, to the extent that any meaning or definition of a term in this present application conflicts with any meaning or definition of the same term in a document incorporated by reference, the meaning or definition assigned to that term in this present application governs.

The invention includes the description, examples, embodiments, and drawings disclosed; but it is not limited to such description, examples, embodiments, or drawings. As briefly described above, the reader should assume that features of one disclosed embodiment can also be applied to all other disclosed embodiments, unless expressly indicated to the contrary. Unless expressly indicated to the contrary, the numerical parameters set forth in the present application are approximations that can vary depending on the desired properties sought to be obtained by a person of ordinary skill in the art without undue experimentation using the teachings disclosed in the present application. Modifications and other embodiments will be apparent to a person of ordinary skill in the packaging arts, and all such modifications and other embodiments are intended and deemed to be within the scope of the invention.

What is claimed is:

1. Paper wrapping materials to securely wrap a rolled-up High Expansion Force product comprising:
   a kraft paper layer encircling a circumference of the product, a leading end of the kraft paper layer adhered to a tail end of the product by a first hotmelt adhesive located between facing surfaces of the leading end of the kraft paper layer and the tail end of the product;
   a tail end of the kraft paper layer adhered to a middle portion of the kraft paper layer with a second hotmelt adhesive located between facing surfaces of the tail end of the kraft paper layer and the middle portion of the kraft paper layer to thereby secure the kraft paper layer encircling the circumference of the product;
   wherein the kraft paper layer has: (i) a Basis Weight from about 68 pounds per 3000 feet squared to about 84 pounds per 3000 feet squared, (ii) a Tensile Strength (MD) from about 55 pounds per inch to about 70 pounds per inch, (iii) a Stretch (MD) from about 7% to about 11%, and (iv) a fiber content that comprises at least 70% virgin fibers; and,
   wherein the second hotmelt adhesive comprises between about 15% and about 25% thermoplastic elastomer.

2. The paper wrapping materials of claim 1, wherein the product has a End Density from about 26 pounds per cubic foot to about 32 pounds per cubic foot.

3. The paper wrapping materials of claim 2, wherein the End Density is from about 28 pounds per cubic foot to about 30 pounds per cubic foot.

4. The paper wrapping materials of claim 1, wherein the second hotmelt adhesive is present in an amount of 0.02 grams per square inch to 0.12 grams per square inch.

5. The paper wrapping materials of claim 4, wherein the second hotmelt adhesive is present in an amount of 0.03 grams per square inch to 0.08 grams per square inch.

6. The paper wrapping materials of claim 1, wherein the second hotmelt adhesive comprises between about 18% and about 22% thermoplastic elastomer.

7. The paper wrapping materials of claim 6, wherein the second hotmelt adhesive comprises about 20% thermoplastic elastomer.

8. The paper wrapping materials of claim 1, wherein the second hot melt adhesive has an Adhesive Set Time of between 15 seconds and 30 seconds.

9. The paper wrapping materials of claim 1, wherein the second hot melt adhesive is in a swirl pattern.

10. The paper wrapping materials of claim 1, wherein the first hot melt adhesive and the second hot melt adhesive are the same type of hot melt adhesive.

11. The paper wrapping materials of claim 1, wherein the kraft paper layer encircles the product between 1.5 and 5 times around the circumference of the product as measured from a leading edge of the leading end of the kraft paper layer to a tail edge of the tail end of the kraft paper layer.

12. The paper wrapping materials of claim 11, wherein the kraft paper layer encircles the product between 1.5 and 3 times around the circumference of the product.

13. The paper wrapping materials of claim 11, wherein at least one wrap of the kraft paper layer around the circumference is essentially free of hotmelt adhesive between adjacent kraft paper layers that encircle the product.

14. The paper wrapping materials of claim 1, wherein the kraft paper layer comprises unbleached kraft fiber.

15. The paper wrapping materials of claim 14, wherein the kraft paper layer comprises unbleached natural kraft fiber.

16. The paper wrapping materials of claim 14, wherein the kraft paper layer has a fiber content that consists essentially of unbleached natural kraft fibers.

17. The paper wrapping materials of claim 1, wherein the Tensile Strength (MD) is from about 60 pounds per inch to about 65 pounds per inch.

18. The paper wrapping materials of claim 1, wherein the Basis Weight is from about 70 pounds per 3000 feet squared to about 80 pounds per 3000 feet squared.

19. The paper wrapping materials of claim 18 wherein the Basis Weight is from about 72 pounds per 3000 feet squared to about 76 pounds per 3000 feet squared.

20. The paper wrapping materials of claim 1, wherein the Stretch (MD) is about 9%.

21. The paper wrapping materials of claim 1, wherein the kraft paper layer has a TEA (MD) from about 28 foot-pounds per foot squared to about 37 foot-pounds per foot squared.

22. The paper wrapping materials of claim 21, wherein the TEA (MD) is from about 30 foot-pounds per foot squared to about 35 foot-pounds per foot squared.

23. The paper wrapping materials of claim 1, wherein the kraft paper layer has a Tear (CD) from about 170 grams to about 205 grams.

24. The paper wrapping materials of claim 23, wherein the Tear (CD) is from about 180 grams to about 195 grams.

25. The paper wrapping materials of claim 1, wherein the kraft paper layer is a Recyclable paper layer.

26. The paper wrapping materials of claim 1, wherein the fiber content is at least 80% virgin fibers.

27. The paper wrapping materials of claim 1, wherein the fiber content is at least 90% virgin fibers.

28. The paper wrapping materials of claim 1, wherein the kraft paper layer has a width dimension about the same as a length dimension of the finish rolled product.

29. The paper wrapping materials of claim 1, wherein the kraft paper layer has a width dimension at least as long as a length dimension of the finish rolled product.

30. Paper wrapping materials to securely wrap a rolled-up High Expansion Force product comprising:
   a kraft paper layer encircling a circumference of the product, a leading end of the kraft paper layer adhered to a tail end of the product by a first hotmelt adhesive located between facing surfaces of the leading end of the kraft paper layer and the tail end of the product;
   a tail end of the kraft paper layer adhered to a middle portion of the kraft paper layer with a second hotmelt adhesive located between facing surfaces of the tail end of the kraft paper layer and the middle portion of the kraft paper layer to thereby secure the kraft paper layer encircling the circumference of the product;
   wherein the kraft paper layer has: (i) a Basis Weight from about 68 pounds per 3000 feet squared to about 84 pounds per 3000 feet squared, (ii) a Tensile Strength (MD) from about 55 pounds per inch to about 70 pounds per inch, (iii) a Stretch (MD) from about 7% to about 11%, (iv) a TEA (MD) from about 28 foot-pounds per foot squared to about 37 foot-pounds per foot squared, (v) a Tear (CD) from about 170 grams to about 205 grams, and (vi) a fiber content that comprises at least 70% virgin fibers; and,
   wherein the second hotmelt adhesive comprises between about 15% and about 25% thermoplastic elastomer.

31. A method to securely wrap a rolled-up High Expansion Force product with paper wrapping materials comprising:
   encircling a circumference of the product with a kraft paper layer, including adhering a leading end of the kraft paper layer to a tail end of the product by a first hotmelt adhesive located between facing surfaces of the leading end of the kraft paper layer and the tail end of the product;
   adhering a tail end of the kraft paper layer to a middle portion of the kraft paper layer with a second hotmelt adhesive located between facing surfaces of the tail end of the kraft paper layer and the middle portion of the kraft paper layer to thereby secure the kraft paper layer encircling the circumference of the product;
   using the kraft paper layer having: (i) a Basis Weight from about 68 pounds per 3000 feet squared to about 84 pounds per 3000 feet squared, (ii) a Tensile Strength (MD) from about 55 pounds per inch to about 70 pounds per inch, (iii) a Stretch (MD) from about 7% to about 11%, and (iv) a fiber content that comprises at least 70% virgin fibers; and,
   using the second hotmelt adhesive comprising a composition of between about 15% and about 25% thermoplastic elastomer.

* * * * *